W. J. WELLS.
Cultivator.
No. 91,802. Patented June 22, 1869.
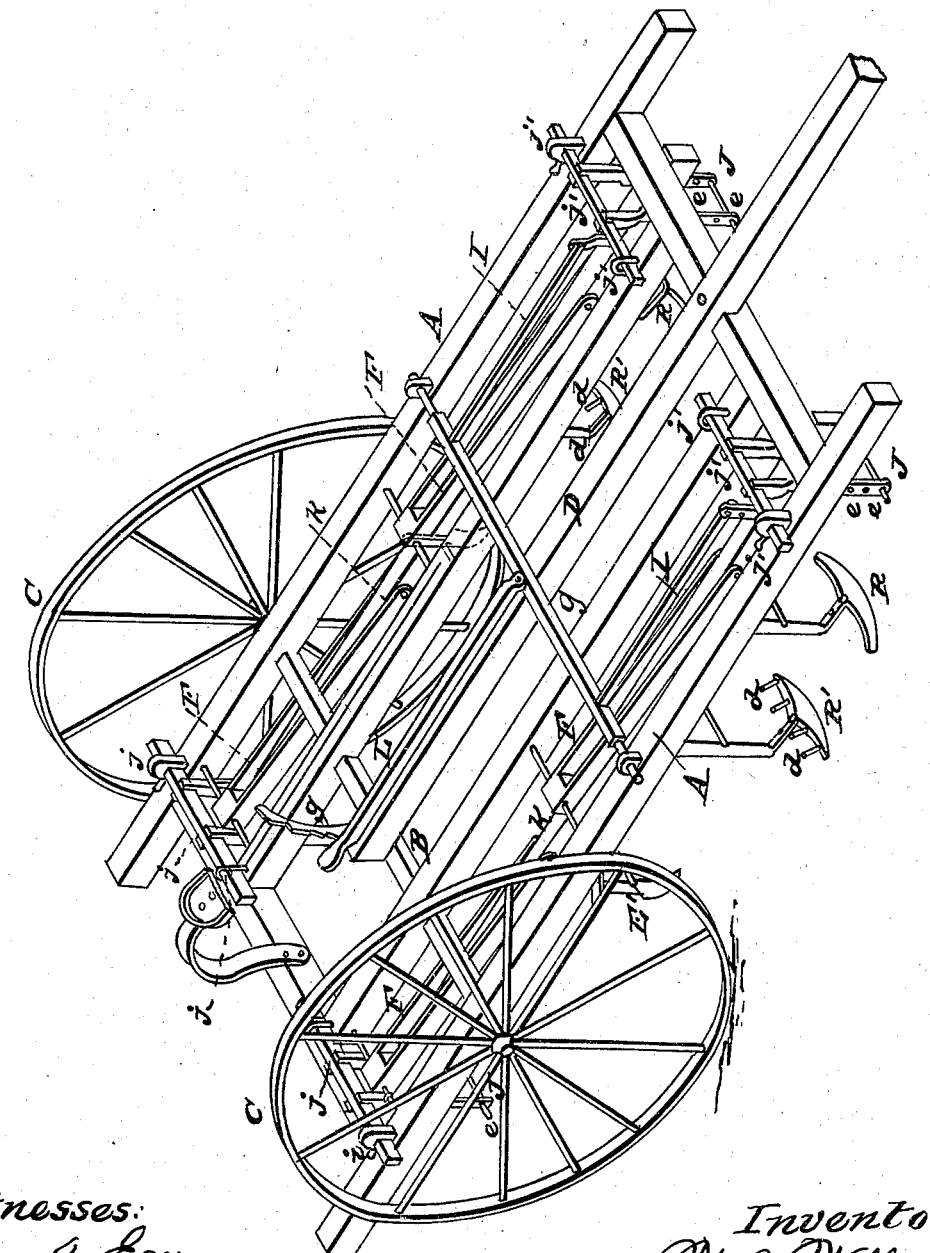

United States Patent Office.

W. J. WELLS, OF SIDNEY, ASSIGNOR TO HIMSELF AND H. W. NEAL, OF TOLEDO, OHIO.

Letters Patent No. 91,802, dated June 22, 1869.

IMPROVEMENT IN CULTIVATORS.

The Schedule referred to in these Letters Patent and making part of the same.

*To all whom it may concern:*

Be it known that I, W. J. WELLS, of Sidney, in the county of Shelby, and State of Ohio, have invented certain new and useful Improvements in Cultivators; and I do hereby declare that the following is a full, clear, and exact description thereof, reference being had to the accompanying drawings, and to the letters of reference marked thereon, which form a part of this specification, in which—

Figure 1 represents a perspective view of my invention.

The object of my invention is to provide a simple and cheap cultivator, by means of which the ground can be plowed to any depth desired, the clogging of the teeth, or plows obviated, and clearing them of all weeds with which they may come in contact, and also feeding the dirt to the plants; and, to this end, My invention consists in the employment of swinging, or pivoted braces, or clevises, between which are confined the beams of the cultivator-teeth, which are operated by means of a lever, the attachment of which will be described hereafter; constructing or providing the cultivator with blades, or plows rounded on their cutting-edges, and bevelled from the centre of their upper portions, on each side, so as to allow them to cut and pass smoothly through the ground; and furnishing either set with a series of fingers, or projections on their upper portions or ends, at a suitable inclination, the office of which will be seen hereafter.

To enable others to make and use my invention, I will now describe its construction and operation.

In the accompanying drawing—

A represents the frame of my machine, which is situated upon the axle B.

G G designate the wheels, which are secured upon the axle B.

D is the tongue of the cultivator.

F F represent the swinging braces, or clevises, pivoted, at their upper ends, between the bars of the frame A, by means of bolts passing through them and entering said bars.

The lower ends of these clevises embrace the beams k k, of the cultivator-teeth, to which they are secured by means of pins. By the use of these clevises, the cultivator-teeth can be raised or lowered when desired.

J J represent four metal supports, or braces, which are formed or provided, at their upper ends, with cross-bars, or supports, j j, passing through staples, or eyes, j' j', fastened to the top of the frame A.

These supports, or braces are made adjustable by means of thumb-screws, i i.

The supports J J are provided, at and near their lower portions, with regulating or adjusting-holes and pins, e e e, for the purpose of lowering or elevating the beams k k, which are confined therein.

I I designate two levers, the horizontal part of which is attached to the shaft g, which has its bearings in staples or boxes, fastened to the upper part of the frame, and the vertical part secured to the sides of the plow-beams k k.

L represents a pawl, or lever, which is firmly attached to the shaft g, and engaging, at its outer end, with a ratchet-bar, g', which will hold it in place when the cultivator-teeth are elevated or depressed in the ground.

R R designate the front set of the cultivator-teeth, or blades, which are rounded at the cutting-edges, and bevelled on their upper portions, from the centre on each side, for the purpose already stated.

R' R' represent a similar set of blades, situated in the rear, and a suitable distance beyond the blades R R, and provided, on their upper ends, with fingers, or projections, d d, for clearing, or removing all weeds with which the plows, or blades may come in contact, and are also made to project a short distance below the plows R R, thus causing them to cut deeper into the earth than the front set.

E E designate another set of blades, or shovels, secured obliquely from the blades R' R', and slightly turned inwardly, the object of which will be explained in connection with the shovels E' E'.

E' E' designate the hinder set of cultivator-teeth, or shovels, which are provided with arms at the upper ends of their shanks, as is the set E E, so that they are made to project inward a small distance from each other. The blades, or shovels E' E', are also turned inward, in order to feed, or carry the dirt to the plants, as already stated.

Having thus described my invention,

What I claim, and desire to secure by Letters Patent, is—

1. The construction of the shovels, or blades R R', substantially as and for the purposes set forth.

2. The arrangement of the shovels E and E' and R and R', substantially in the manner and for the purpose set forth.

3. The combination of the plows R R' and E E', levers I I and L, and ratchet-bar g', all arranged substantially in the manner set forth.

In testimony that I claim the foregoing as my own, I affix my signature, in presence of two witnesses.

W. J. WELLS.

Witnesses:
W. G. WILLIAMS,
JOHN F. WRIGHT.